United States Patent
Carichner et al.

(10) Patent No.: US 10,080,177 B2
(45) Date of Patent: Sep. 18, 2018

(54) UNLICENSED SPECTRUM OFFLOAD ARCHITECTURE FOR SMALL-CELL BASE STATIONS

(71) Applicant: Intel Corporation, Santa Clara, CA (US)

(72) Inventors: Scott Carichner, Los Angeles, CA (US); Khurram Parviz Sheikh, San Clemente, CA (US); Shankarakrishnan Venkatraman, Santa Ana, CA (US); Jacob Sharony, Dix Hills, NY (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 14/768,144

(22) PCT Filed: Mar. 13, 2014

(86) PCT No.: PCT/IB2014/001076
§ 371 (c)(1),
(2) Date: Aug. 14, 2015

(87) PCT Pub. No.: WO2014/140877
PCT Pub. Date: Sep. 18, 2014

(65) Prior Publication Data
US 2015/0382272 A1    Dec. 31, 2015

Related U.S. Application Data

(60) Provisional application No. 61/798,467, filed on Mar. 15, 2013.

(51) Int. Cl.
*H04W 40/02*    (2009.01)
*H04L 12/46*    (2006.01)
(Continued)

(52) U.S. Cl.
CPC ............. *H04W 40/02* (2013.01); *H04L 12/46* (2013.01); *H04W 88/10* (2013.01);
(Continued)

(58) Field of Classification Search
None
See application file for complete search history.

(56) References Cited

U.S. PATENT DOCUMENTS

2003/0076832 A1* 4/2003 Ni .................... H04L 12/5601
                                                                370/395.1
2005/0157675 A1* 7/2005 Feder ..................... H04W 4/04
                                                                370/328
(Continued)

FOREIGN PATENT DOCUMENTS

CN    101895929 A    11/2010
CN    105340359 A    2/2016
(Continued)

OTHER PUBLICATIONS

"International Application Serial No. PCT/IB2014/001076, International Search Report dated Dec. 17, 2014", 6 pgs.
(Continued)

*Primary Examiner* — Faruk Hamza
*Assistant Examiner* — Cassandra Decker
(74) *Attorney, Agent, or Firm* — Schwegman Lundberg & Woessner, P.A.

(57) ABSTRACT

A small cell base station and method are disclosed for directing packets for the conversion of an internet protocol backhaul communications link into an RF transmit and simultaneously an RF receive signal into an internet protocol backhaul communications link between different air interface technologies. Packets are directed between licensed and unlicensed spectrum according to criteria that are implemented in algorithms running on electronic processors. The
(Continued)

small cell base station includes a licensed spectrum baseband module that exchanges packets with the IP backhaul network, and an unlicensed spectrum baseband module that exchanges packets with the licensed spectrum baseband module but not with the IP backhaul network.

5 Claims, 5 Drawing Sheets

(51) Int. Cl.
*H04W 88/10* (2009.01)
*H04W 84/12* (2009.01)
*H04W 84/04* (2009.01)

(52) U.S. Cl.
CPC ........ *H04W 84/042* (2013.01); *H04W 84/045* (2013.01); *H04W 84/12* (2013.01)

(56) References Cited

U.S. PATENT DOCUMENTS

| | | | |
|---|---|---|---|
| 2009/0296635 A1* | 12/2009 | Hui | H04W 48/10 370/328 |
| 2012/0314692 A1* | 12/2012 | Tinnakornsrisuphap | H04W 92/045 370/338 |
| 2014/0140335 A1* | 5/2014 | Wang | H04W 28/08 370/338 |

FOREIGN PATENT DOCUMENTS

| | | | | |
|---|---|---|---|---|
| EP | 1786222 A1 | 5/2007 | | |
| EP | 2254382 A2 | 11/2010 | | |
| EP | 2451218 A1 | 5/2012 | | |
| EP | 2974520 B1 | 3/2017 | | |
| WO | WO 2012159344 A1 * | 11/2012 | ............ | H04W 28/08 |
| WO | WO-2013036487 A1 | 3/2013 | | |
| WO | WO2014/140877 A2 | 9/2014 | | |

OTHER PUBLICATIONS

"International Application Serial No. PCT/IB2014/001076, Invitation to Pay Additional Fees and Partial Search Report dated Oct. 29, 2014", 8 pgs.

"International Application Serial No. PCT/IB2014/001076, Written Opinion dated Dec. 17, 2014", 15 pgs.

Xie, Lu, et al., "Efficient time synchronization of 1588v2 technology in packet network", Communication Software and Networks (ICCSN), 2011 IEEE 3rd International Conference on, (May 27, 2011), 181-185.

"Chinese Application Serial No. 201480008182.5, Voluntary Amendment dated Jun. 8, 2016", w/English Claims, 19 pgs.

"European Application Serial No. 14744143.0, Response filed Apr. 22, 2016 to Communication pursuant to Rules 161(1) and 162 EPC dated Oct. 22, 2015", 18 pgs.

"International Application Serial No. PCT/IB2014/001076, International Preliminary Report on Patentability dated Sep. 24, 2015", 17 pgs.

"Chinese Application Serial No. 201480008182.5, Office Action dated Feb. 24, 2018", w/English Translation, 15 pgs.

* cited by examiner

UNLICENSED SPECTRUM OFFLOAD ARCHITECTURE FOR SMALL-CELL BASE STATIONS

This application is a U.S. National Stage Filing under 35 U.S.C. 371 from International Application No. PCT/IB2014/001076, filed Mar. 13, 2014 and published in English as WO 2014/140877 on Sep. 18, 2014, which claims the benefit of priority to U.S. Provisional Patent Application Ser. No. 61/798,467, filed Mar. 15, 2013, each of which is incorporated herein by reference in its entirety.

BACKGROUND

Small cell base stations typically correspond to single sector stand-alone base stations housed in a single enclosure. The small cell base stations convert internet protocol backhaul communications links into RF transmit signals and converts RF receive signals into internet protocol backhaul communications links. Small cell base stations often support multiple air interface technologies to enable high capacity data throughput over a generally smaller coverage area relative to other infrastructure equipment. A group of supported users may utilize one or more of the air interface technologies at any one time based on goals of the network operator.

Modern small-cell backhaul technologies using Internet Protocol (IP) typically multiplex multiple air interface technologies with an IP switch that directs the packets correctly between the backhaul and the baseband modules.

SUMMARY OF THE INVENTION

The present invention is a system and related method for routing packets including those exchanged with an IP backhaul network. The system is a small cell base station coupled between an IP backhaul network and one or more mobile transceiver units. The small cell base station includes a licensed spectrum baseband module coupled to the IP backhaul network and to a first RF transceiver. It also includes an unlicensed spectrum baseband module coupled to the licensed spectrum baseband module coupled to a second RF transceiver. The licensed spectrum baseband module alone exchanges signals with the IP backhaul network and is configured to determine whether received packets are to be routed to or from the first and second RF transceivers as licensed or unlicensed spectrum data flow packets. The small cell base station may be configured with a common timing method or a timing transfer protocol for accurate timing of packet transfer from the IP backhaul network.

The method of the system includes two primary processes. The first process involves exchanging packets through a small cell base station coupled between an IP backhaul network and one or more mobile transceiver units by receiving at the small cell base station an IP packet from the IP backhaul network, determining whether the IP packet has a destination in a WiFi UE range, processing the IP packet as a LTE packet if the IP packet destination is not in the WiFi UE range, determining whether the IP packet should be transferred to a UE as an LTE IP flow even if the IP packet destination is not in the WiFi UE range and routing the IP packet to a WiFi Ethernet interface if it is determined that the IP packet should not be routed as an LTE IP flow. The second process involves exchanging packets through a small cell base station coupled between a WiFi module and one or more mobile transceiver units by receiving at the small cell base station an IP packet from the WiFi module, determining whether the IP packet has a WiFi backhaul destination, processing the IP packet locally if the IP packet does not have a WiFi backhaul destination and routing the IP packet to the WiFi module if it is determined that the IP packet does have a WiFi backhaul destination.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, which are briefly described as follows.

DETAILED DESCRIPTION OF THE INVENTION

Generally described, the present application relates to an architecture that improves the utilization of multiple communication bandwidths for information exchange. More specifically, aspects of the present disclosure relate to the partition of data flow by a small cell base station between licensed spectrum and unlicensed spectrum. Illustratively, a small cell base station, or small cell, may transmit or receive information in compliance with one or more air interface standards promulgated by standards-based organizations, such as 3GPP and 3GPP2 (i.e., 1×RTT, EVDO, WCDMA, HSPA, LTE, LTE-A, WiMAX, and the like). Air interface standards and methodologies that use spectrum requiring a governmental agency license which provides exclusive use of that spectrum, such as the above described examples, are generally referred to as licensed technologies. Additionally, the small cell may also be configured to transmit or receive information in compliance with one or more additional air interface standards promulgated by standards based organization, such as the IEEE (i.e., one or more of the IEEE 802.11a,b,g,n, or ac air interface standards). Air interface standards using spectrum not requiring an exclusive license by governmental agencies, such as the above described example, are generally referred to as unlicensed technologies. Accordingly, aspects of the present disclosure relate to the method of directing packets for the conversion of an internet protocol backhaul communications link into an RF transmit and simultaneously an RF receive signal into an internet protocol backhaul communications link between different air interface technologies. In one aspect, directing between licensed and unlicensed spectrum according to criteria that are implemented in algorithms running on electronic processors.

One skilled in the relevant art will appreciate that the disclosed embodiments and examples are illustrative in nature. Accordingly, the disclosed embodiments and examples should not be construed as limiting. Additionally, although various aspects of the present disclosure have been identified and may be described together, the present disclosure is not limited to embodiments in which all the identified aspects must be considered or combination of any described aspects should be required.

Figure 1:
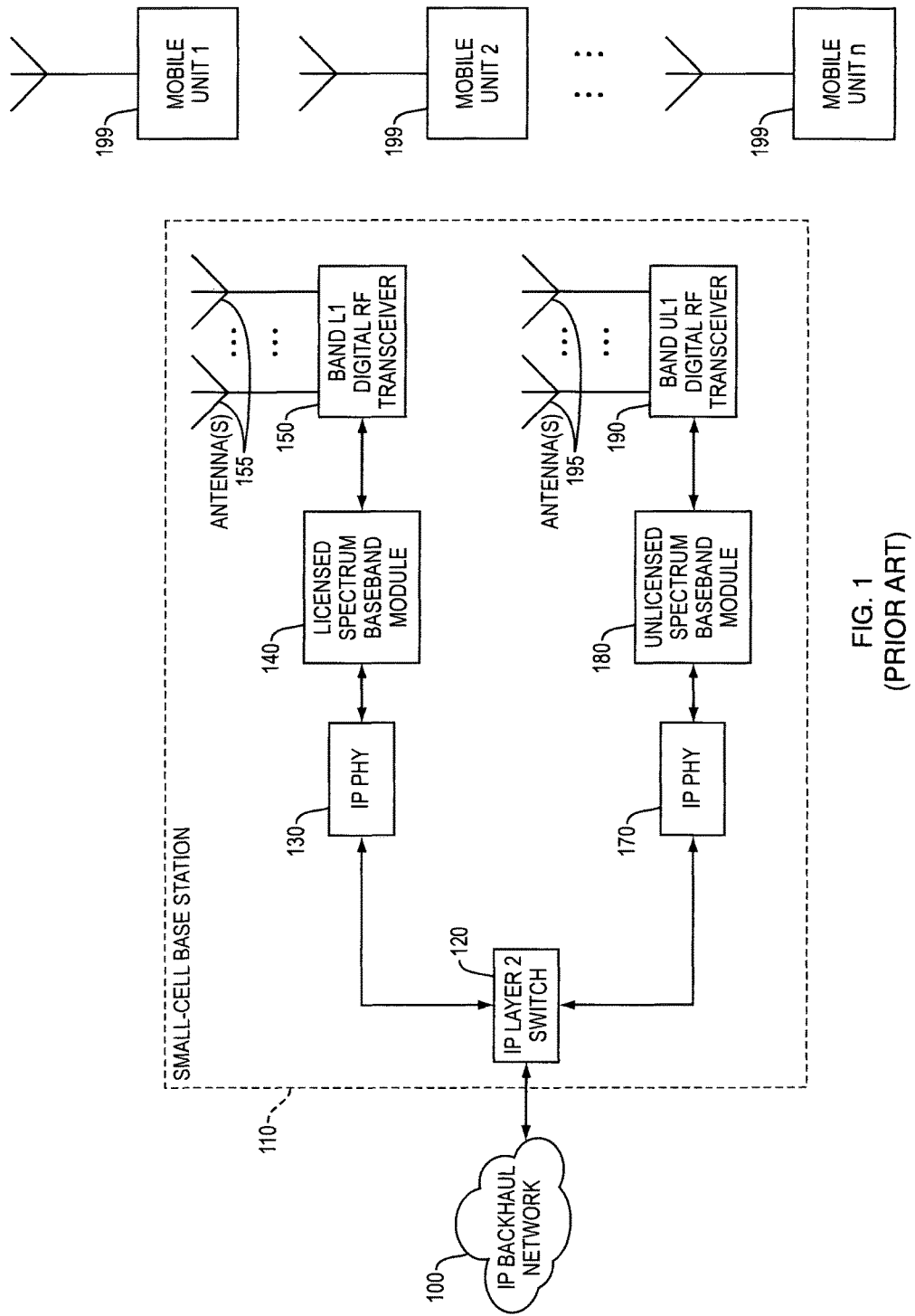
FIG. 1 is a block diagram illustrative a traditional small cell base station for utilization in a heterogeneous communication network.

FIG. 1 is a traditional small cell base station for utilization in a heterogeneous communication network. In a traditional configuration, small cell base stations (110) can be configured with an Internet Protocol (IP) layer 2 switch (120). The IP layer 2 switch is limited to using only Ethernet MAC address information to identify which packets should be routed from a backhaul network (100) to each of the appropriate sub-systems (140, 180) associated with the small cell base station. Typical IP layer 2 switches do not incorporate any additional mechanisms for optimizing the routing of packets.

One skilled in relevant art will appreciate that the utilization of an IP layer 2 switch (120) in a small cell can add delay in the transmission of packets. Such a delay may degrade the critical timing accuracy of the timing transfer protocols used on the backhaul connection. Such delay can be characterized as "jitter." Additionally the switch (120) may include the capability to use IP addresses to make smarter switching or routing decisions between the ports of the switch. This is usually referred to as a layer 3 switch, but it still exhibits the problems that have been described for the layer 2 switch.

Figure 2:
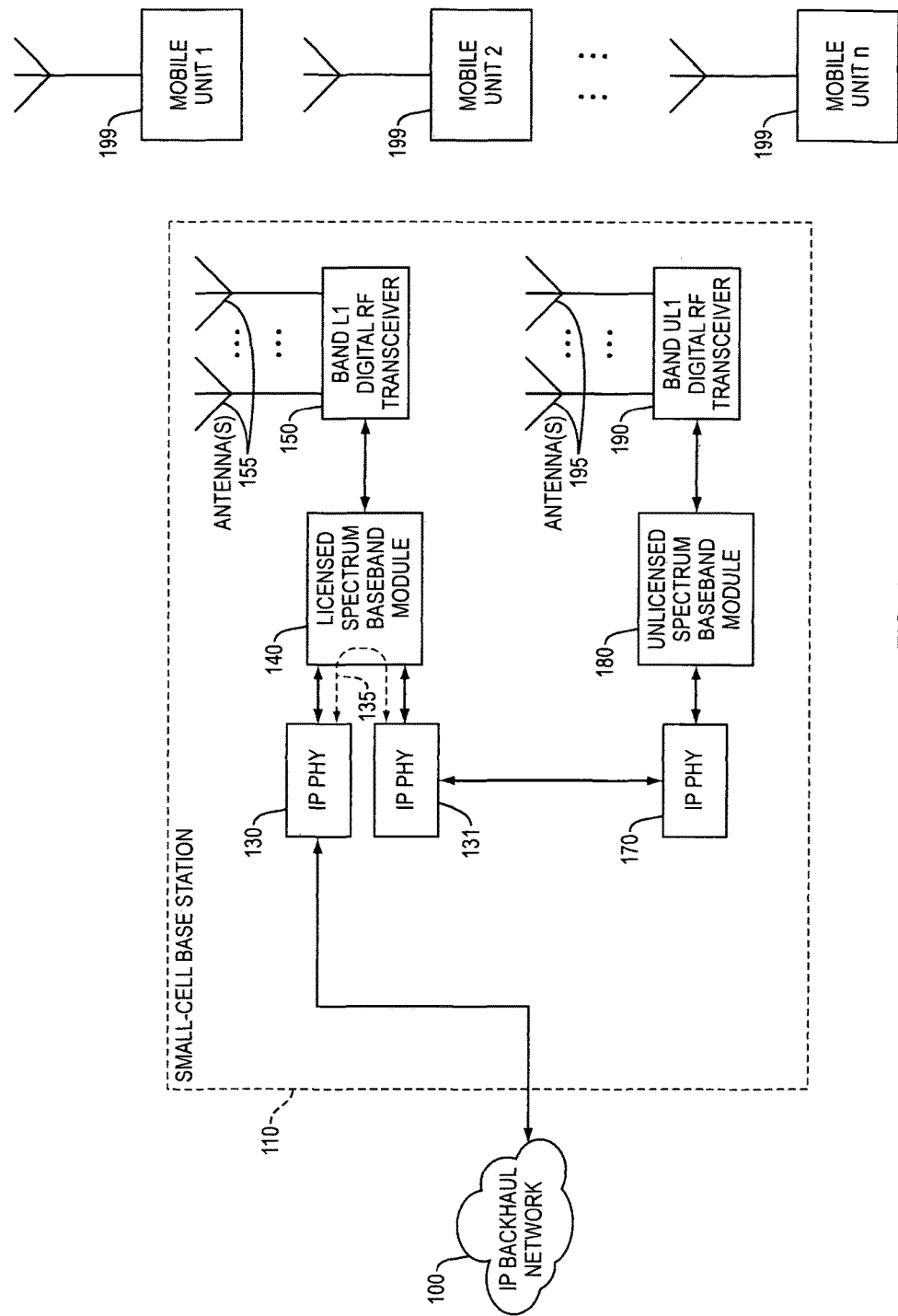
FIG. 2 is a block diagram illustrative of an embodiment of a small cell base station including a licensed spectrum baseband module and an unlicensed spectrum baseband module.

FIG. 2 is a block diagram illustrative of an embodiment of a small cell base station including a licensed spectrum baseband module and an unlicensed spectrum baseband module. As illustrated in FIG. 2, a small-cell base station (110) is shown wherein an unlicensed spectrum baseband module (180) has backhaul communications routed through the licensed spectrum baseband module (140). Illustratively, IP packets received or transmitted by the small cell pass through the licensed spectrum baseband module. Thereafter, the licensed spectrum baseband module inspects IP packets to determine whether the received packet should be routed through and remain as an unlicensed spectrum data flow packet. Alternatively, the licensed spectrum baseband module can determine whether the received IP packet should be re-routed through the licensed spectrum module (140) and the Band L1 digital RF transceiver (150) to one particular mobile Unit (199).

Illustratively, the exchange of the IP packets between the modules using some physical layer protocol (e.g., Ethernet) is facilitated by the PHY conversion modules (130, 131, and 170) which convert between the digital logic signals and the format used for the physical layer protocol. As illustrated in FIG. 2, no modules are configured in between the IP backhaul network (100) and the Licensed Spectrum Baseband module (140). In some embodiments, a base station establishes timing by common timing methods (e.g., GPS, A-GPS) and frequency methods (e.g., OCXO), but in situations in which the common timing methods cannot be used, either because they are not within receiving range or they are too expensive to include in the design, illustratively, a timing transfer protocol (e.g., IEEE1588v2) can be used to accurately transfer timing to the small cell base station (110) from the backhaul network. Such a configuration may eliminate delays (e.g., jitter) that may be added into the packet transfer process. For example, a jitter-causing switch may be avoided between timing critical licensed spectrum module (140) and the IP backhaul network (100).

Figure 3:
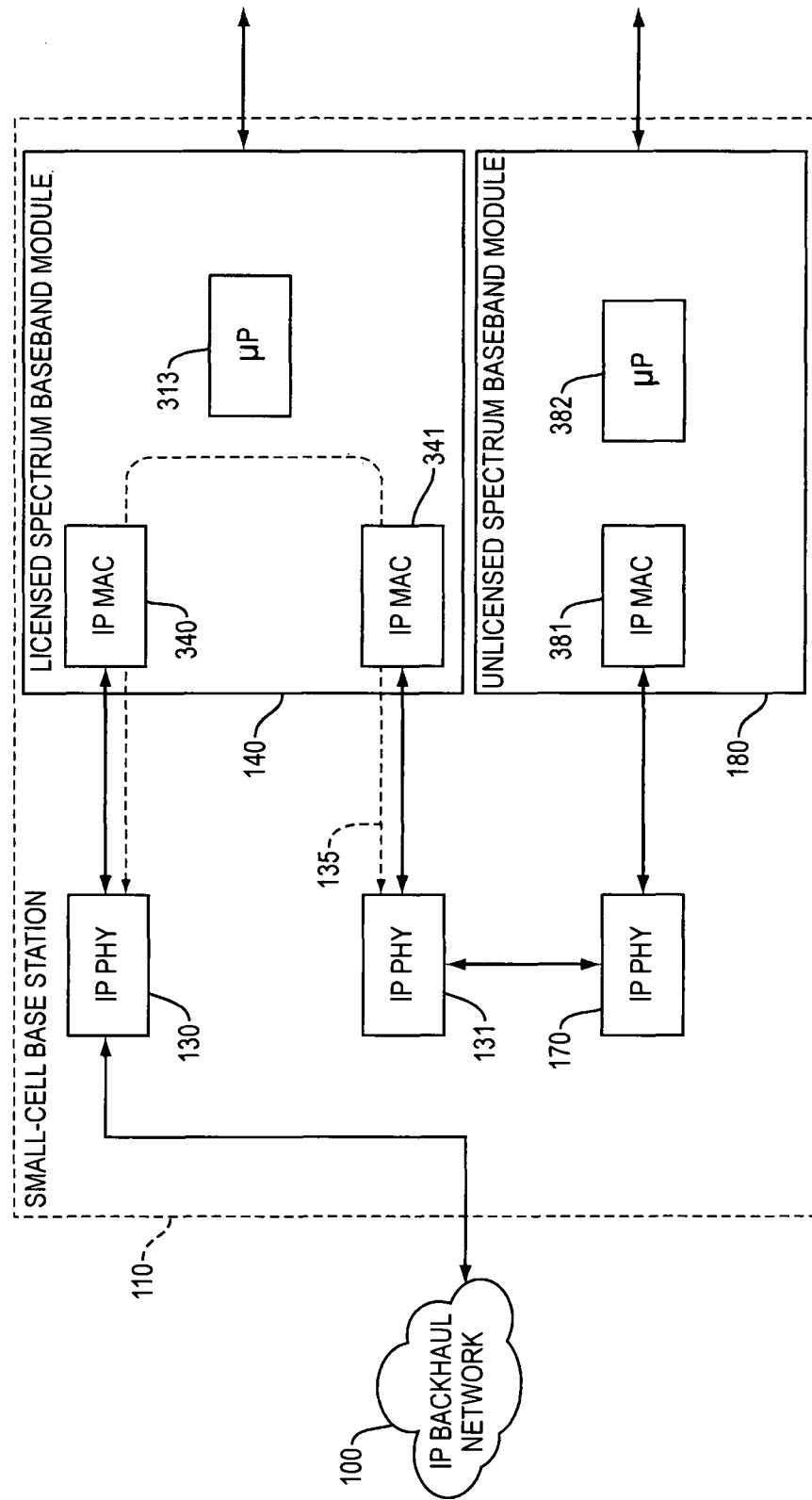
FIG. 3 is a block diagram illustrative of embodiments of a licensed spectrum baseband module and an unlicensed spectrum baseband module for utilization in a small cell base station.

FIG. 3 is block diagram illustrative of embodiments of a licensed spectrum baseband module and an unlicensed spectrum baseband module for utilization in a small cell base station. In this embodiment, the licensed spectrum baseband module (140) includes two IP MACs (340, 341) to handle IP traffic to the backhaul and to the unlicensed module (180). A microprocessor (313) is used to run an algorithm (FIGS. 5A and 5B) that examines each packet to decide whether it should be transferred to the other MAC or integrated into its own air interface to be transmitted to a connected mobile. If the algorithm determines that the packet should be transferred to the other MAC (341) it is directed via the MAC and IP addressing scheme properly so that it reaches the unlicensed spectrum module (180) and subsequently reaches via the unlicensed air interface the mobile to which it is addressed.

Figure 4:
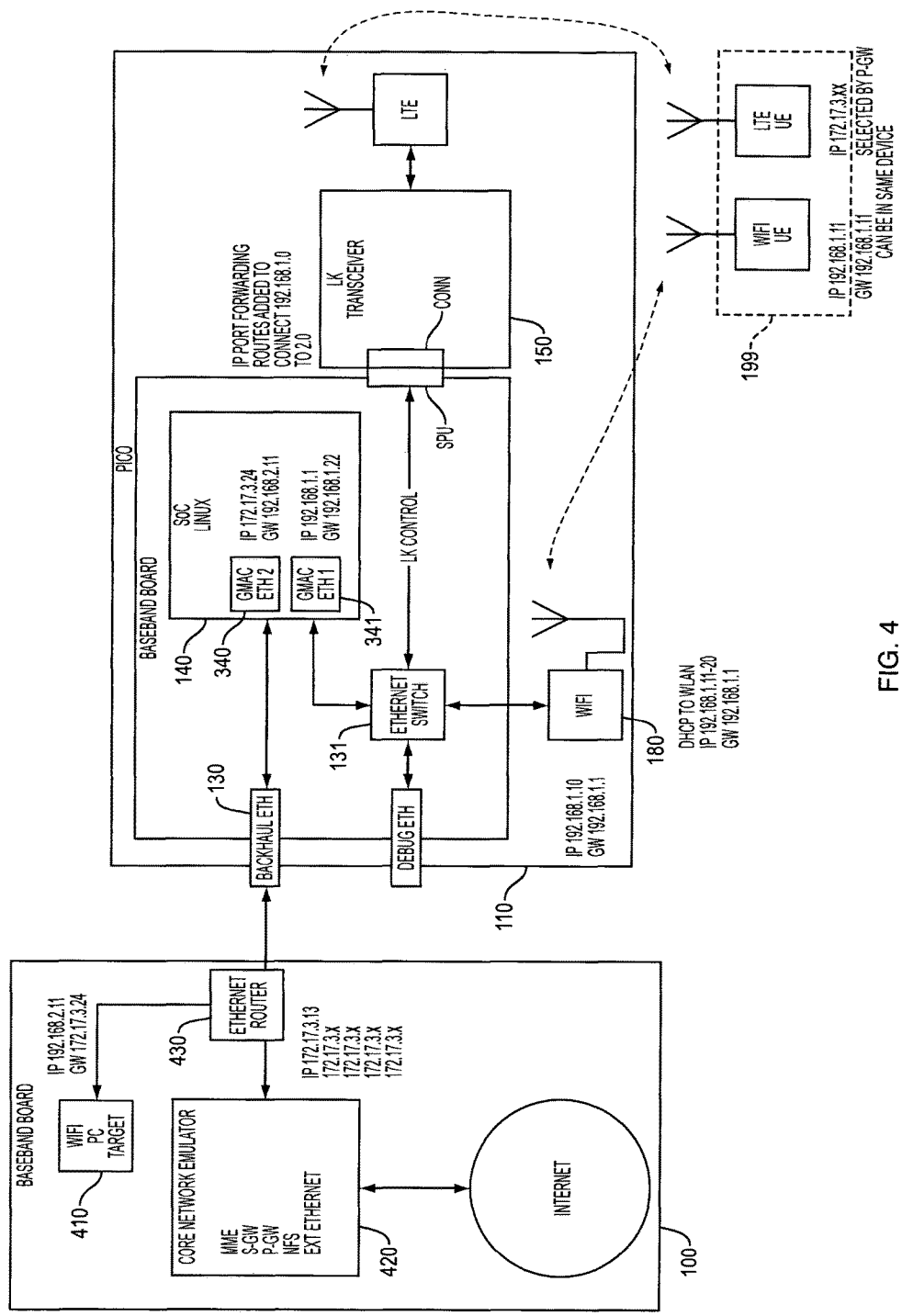
FIG. 4 is a block diagram illustrative the interaction of a mobile device, small cell base station and core network components.

FIG. 4 is a block diagram illustrative of the interaction of a mobile device, small cell base station and core network components. As illustrated in FIG. 4, the IP and Gateway addresses may be used to facilitate the implementation of aspects of the present disclosure when using an Ethernet physical layer. The units may be configured this way for convenience if the unlicensed module (180) uses the Wi-Fi IEEE802.11a,b,g,n or ac protocols. Using this method the algorithm running in the microprocessor can simplify the amount of processing needed by using a standard TCP/IP protocol stack, such as the one available in the Linux operating system to bridge between sub-nets when the Wi-Fi packets are inspected. If the inspection determines that it is best to route the unlicensed spectrum packets received at the licensed spectrum module directly to or from the backhaul then a simple routing table can be used to bridge the IP subnets. Otherwise the packets will be intercepted and re-configured so that they will be delivered through the licensed spectrum module's air interface to the targeted Mobile.

Figure 5B:
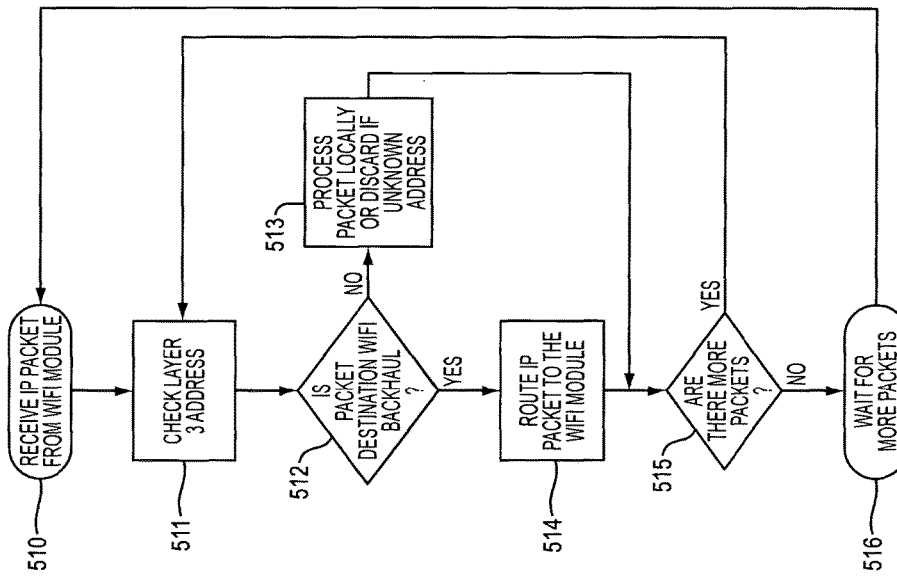
FIGS. 5A and 5B are flow diagram illustrative of packet processing routines implemented by a small cell base station of the present invention.
Figure 5A:
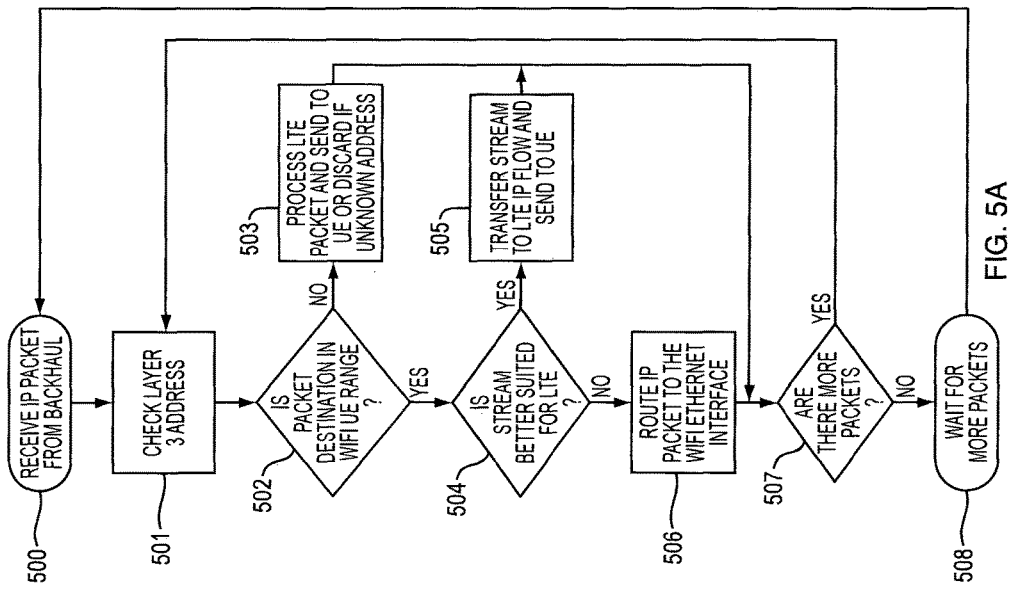

FIGS. 5A and 5B are flow diagram illustrative of packet processing routines implemented by small cell base station. Illustratively, the routines in FIGS. 5A and 5B may be implemented by the microprocessor (313) that determines how the packets are physically routed to and from the network backhaul (100) and the unlicensed module (180). The algorithm defined here has already been informed by algorithms disclosed in separate filings which packet addresses to route and where to route them. This algorithm takes as input a mapping table that says where and how to route the packets.

Similarly, packets that are addressed and intended for the licensed module (140) may be determined to be better suited for the unlicensed module (180) by algorithms disclosed in separate filings. In that case, the microprocessor (313) can route those packets to and from the unlicensed module by re-configuring the addresses to maintain a path between the MAC (341) on the licensed baseband module and the MAC (381) on the unlicensed baseband module.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components, such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A small cell base station configured to operate between an IP backhaul network and one or more mobile transceiver units, the small cell base station comprising:
   unlicensed spectrum baseband circuitry located in an unlicensed spectrum baseband module and coupled to an unlicensed spectrum RF transceiver; and
   licensed spectrum baseband circuitry located in a licensed spectrum baseband module and coupled to the IP backhaul network, to a licensed spectrum RF transceiver and to the unlicensed spectrum baseband circuitry, the licensed spectrum baseband circuitry that is located in the licensed spectrum baseband module including a microprocessor and first and second IP MACs, the first IP MAC being configured to receive data packets from and send data packets to the IP backhaul network, and the second IP MAC being configured to receive data packets from and send data packets to the unlicensed spectrum baseband circuitry that is located in the unlicensed spectrum baseband module;
   wherein the microprocessor of the licensed spectrum baseband circuitry is configured to determine whether data packets received from the IP backhaul network via the first IP MAC are to be routed to a targeted mobile device without passing through the second IP MAC, or are to be routed to the targeted mobile device via the second IP MAC, and
   wherein if the received data packets are to be routed to the targeted mobile device via the second IP MAC, the microprocessor changes a destination address of the data packets to an address of the unlicensed spectrum baseband module.

2. The small cell base station of claim 1 wherein the small cell base station is configured with a common timing method or a timing transfer protocol for accurate timing of data packet transfer from the IP backhaul network.

3. The small cell base station of claim 1 wherein data packets are exchanged between the IP backhaul network and the licensed spectrum baseband circuitry through first IP PHY conversion circuitry and data packets are exchanged between the licensed spectrum baseband circuitry and the unlicensed spectrum baseband circuitry through second IP PHY conversion circuitry.

4. The small cell base station of claim 3 further comprising third IP PHY conversion circuitry coupled between the second IP PHY conversion circuitry and the unlicensed spectrum baseband circuitry.

5. The small cell base station of claim 1, wherein each of the first and second IP MACs includes a gigabit Ethernet MAC (GMAC).

* * * * *